(12) United States Patent
Concha et al.

(10) Patent No.: US 11,954,069 B2
(45) Date of Patent: Apr. 9, 2024

(54) FIND OPERATION FOR UNION-MOUNTED SYSTEMS

(71) Applicant: SAP SE, Walldorf (DE)

(72) Inventors: Darwin Ttito Concha, Walldorf (DE); Mark Waldaukat, Walldorf (DE); Edison Kleiber Ttito Concha, Walldorf (DE)

(73) Assignee: SAP SE, Walldorf (DE)

( * ) Notice: Subject to any disclaimer, the term of this patent is extended or adjusted under 35 U.S.C. 154(b) by 185 days.

(21) Appl. No.: 17/380,118

(22) Filed: Jul. 20, 2021

(65) Prior Publication Data
US 2023/0032682 A1 Feb. 2, 2023

(51) Int. Cl.
*G06F 17/00* (2019.01)
*G06F 7/00* (2006.01)
*G06F 16/13* (2019.01)
*G06F 16/14* (2019.01)
*G06F 16/185* (2019.01)

(52) U.S. Cl.
CPC ............ *G06F 16/148* (2019.01); *G06F 16/13* (2019.01); *G06F 16/185* (2019.01)

(58) Field of Classification Search
CPC ....... G06F 16/148; G06F 16/13; G06F 16/185
USPC ........................................................ 707/769
See application file for complete search history.

(56) References Cited

U.S. PATENT DOCUMENTS

| | | | | |
|---|---|---|---|---|
| 9,367,569 B1 * | 6/2016 | Shukla | .................. | G06F 16/113 |
| 2003/0233647 A1 * | 12/2003 | Blaser | ...................... | G06F 8/61 |
| | | | | 717/174 |
| 2006/0224409 A1 * | 10/2006 | Leininger | ............... | G06F 16/13 |
| | | | | 705/1.1 |
| 2006/0294163 A1 * | 12/2006 | Armangau | .............. | G06F 16/13 |
| | | | | 707/E17.01 |
| 2007/0016565 A1 * | 1/2007 | Evans | .................... | G06F 16/958 |
| 2008/0005133 A1 * | 1/2008 | Khalidi | ................. | G06F 16/192 |
| | | | | 707/999.1 |
| 2009/0070293 A1 * | 3/2009 | Vechersky | .............. | G06F 16/29 |
| | | | | 707/999.003 |
| 2009/0116668 A1 * | 5/2009 | Davidson | ............... | G11B 27/34 |
| | | | | 386/338 |
| 2009/0150449 A1 * | 6/2009 | Mcclanahan | ....... | G06F 16/1744 |
| | | | | 707/999.2 |
| 2009/0150477 A1 * | 6/2009 | Mcclanahan | ......... | G06F 16/172 |
| | | | | 709/203 |

(Continued)

*Primary Examiner* — Pavan Mamillapalli
(74) *Attorney, Agent, or Firm* — Buckley, Maschoff & Talwalkar LLC

(57) ABSTRACT

Provided is a system and method which may execute a find operation on a union mount via individual find operations on the underlying file systems that make up the union mount rather than perform the find operation through the union mount itself. As a result, processing time of can be significantly reduced. In one example, the method may include receiving a request for a data item to be retrieved from a union-mounted file system comprising a plurality of layers of files which have been merged together, simultaneously executing, via a file manager, a plurality of find operations on the plurality of layers, respectively, without merging the plurality of layers together, receiving a plurality of sets of search results of the plurality of find operations from the plurality of layers in response to the executing, and merging and displaying the plurality of sets of search results.

20 Claims, 7 Drawing Sheets

(56) References Cited

U.S. PATENT DOCUMENTS

| | | | | |
|---|---|---|---|---|
| 2009/0307282 A1* | 12/2009 | Chang | .................... | G06F 16/16 |
| | | | | 707/999.203 |
| 2015/0347984 A1* | 12/2015 | Sheykh-Zade | ...... | G06F 3/04842 |
| | | | | 705/7.19 |
| 2016/0342621 A1* | 11/2016 | Mylvara | ................ | G06F 16/192 |
| 2018/0165299 A1* | 6/2018 | Danilov | .............. | G06F 16/1794 |
| 2020/0250140 A1* | 8/2020 | Munk | ................. | G06F 16/1734 |
| 2021/0311759 A1* | 10/2021 | Corrie | ....................... | G06F 8/63 |

\* cited by examiner

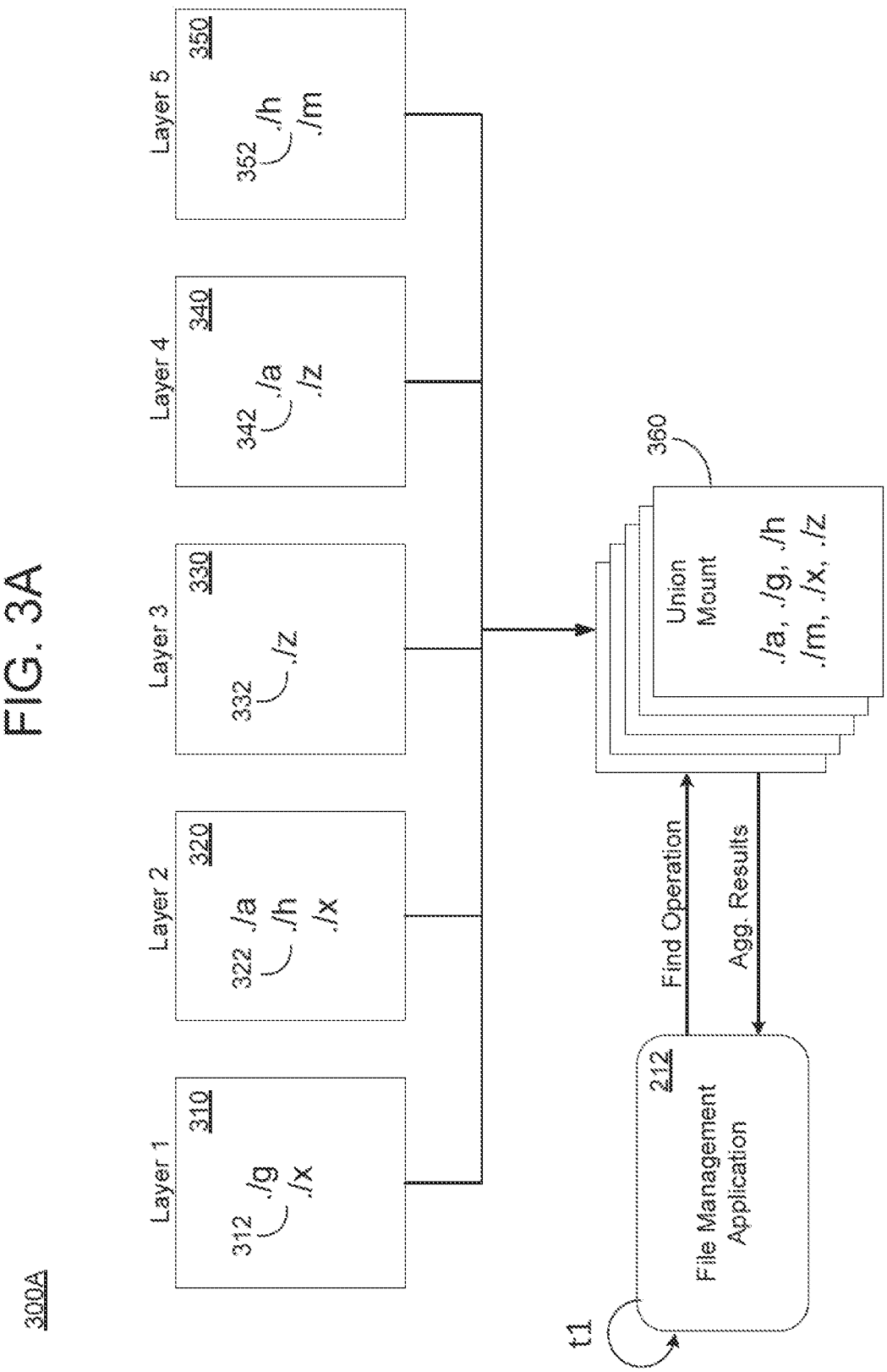

FIND OPERATION FOR UNION-MOUNTED SYSTEMS

BACKGROUND

A file system controls how data is stored and retrieved from a storage device such as a hard disk drive, a solid-state drive (SSD), a magnetic tape drive, an optical disc, main memory (e.g., random access memory (RAM)), and the like. Meanwhile, a distributed file system controls how data is stored across a distributed group of storage devices. The file system may include various directories such as physically shared directories which reside on a global host, logically shared directories which reside on a local host by have links to the global host, and local directories which reside only on the local host. Other systems such as databases can be built on top of the general data storage services provide by the file system.

In a cloud computing environment, a file system may be used to provide traditional file system protocols to applications hosted by the cloud computing environment. To help reduce the complexity within the cloud, cloud computing environments may rely on container-centric software, for example, KUBERNETES®, etc., for deploying and operating cloud applications inside containers. Each container may include the data needed to run a corresponding application included in the container such as application code, system libraries, default values, and the like. Multiple containers (multiple applications) may be grouped together into a pod for more efficiency. When an application desires to find a file within the file system, the file system may execute a find operation to find the file within the file system.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 3A is a diagram illustrating a process of executing a find operation on a union-mounted file system.

Figure 1:
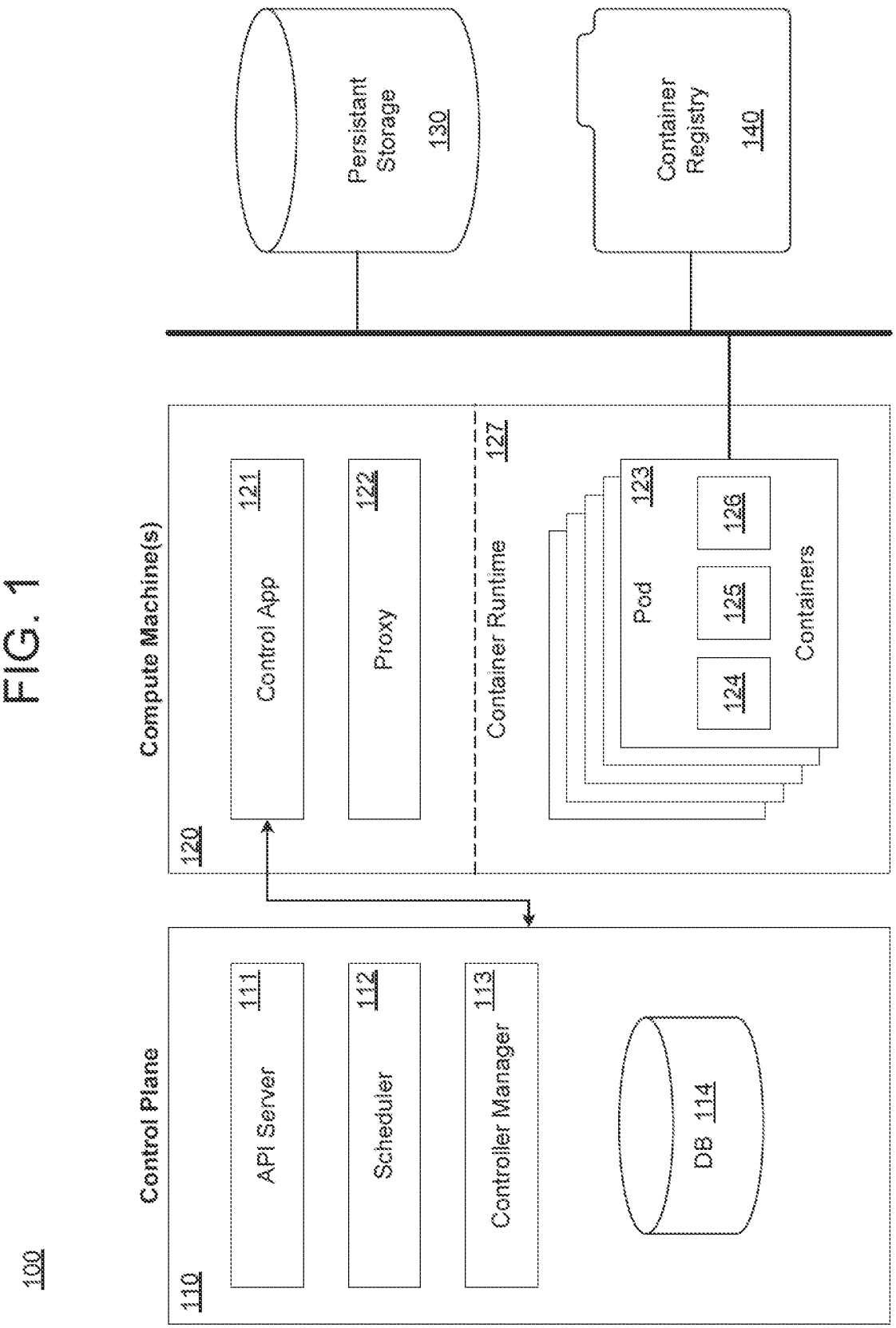
FIG. 1 is a diagram illustrating an architecture of a host platform implementing containerized applications in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

A find operation is used to find data files within a file system. A find operation may specify a data item, such as a file name, or the like, that is to be searched. The find operation may be executed by a file manager of the file system. Meanwhile, union-mounting is a process in which multiple file systems (layers) can be combined on a single mount point, with the resulting mount showing the logical combination of all the file systems. Here, the union mount provides access to all directories and files present in the root directory or mount point. In the kernel, for example, the file systems may be stacked in an order of their mount sequence with the first being at the bottom of the stack and the last being at the top of the stack. The union mounting process may include adding all the layers to a root directory and making such layers accessible in a common view. Duplicate files between the layers may be removed based on a priority among the layers, or both/duplicate files may be provided.

For a union-mounted file system, a find operation is typically performed by the union-mounted file system directly on the union mount. In other words, the files are accessed via the union mount. This allows one find operation to be performed on all of the fused layers (file systems) at once. However, the union mount can create additional delay on the find operation. In some cases, it can even lead to a timeout.

The example embodiments are directed to a process of performing a find operation on a union-mounted filed system. Rather than perform the find operation on the union mount, a file manager can perform separate respective find operations on each of the underlying file layers (file systems) that make up the union mount. The file manager may fuse together the search results from the different layers based on any union-mounting protocols and remove any duplicates. Thus, the find operation can be performed on the union mounted files, without going through the union mount itself. The results that are output by the find operation in the example embodiments are the same as if they were performed via the union mount. However, because the union mount is avoided, the process can be performed much faster.

Experimental results have indicated a significant reduction in processing time. In one example involving 50 layers (50 file systems), the processing time went from about 1 minute when processing on the union mount to about 3 seconds when processing on the individual layers and then fusing the results afterwards. In this example, it took about 2 seconds to process the find operation on each individual layer which results in about 100 seconds of processing time. However, these find operations can be executed simultaneously/in parallel thereby reducing the total processing time down to a little more than 2 seconds. Therefore, by not processing the find operation on the union mount, the system saved about 58 seconds of processing time by performing the find operation on the individual layers separately and fusing the data subsequently.

The results of the find operation may be a plurality of file paths from the different layers that have the item or a similar item as the item being searched for. For example, keywords may be used to identify file names with similar keywords, or the like. The file path may identify the folder location (e.g., folder name or path of names) of the file's location within the respective layer (file system). Duplicate file paths may be removed or otherwise condensed in some way to prevent unnecessary redundancy when viewing the search results.

In some data intelligence (DI) systems, a software application of a tenant (e.g., vFlow application) makes an API call to a file manager (e.g., vRep server) to list all the files, with a json extension, present in a union view originated by the tenant, user and application layers. In this case, if the find operation takes too long, the vRep server will timeout. This causes the whole process to terminate and be started over. In the present application, the find operation is not performed on the union view. Instead, individual find operations are executed simultaneously on the different layers thereby significantly increasing the overall processing time of the find operation. Below is an example of some test cases that were run and the changes in processing time that resulted.

| # Layers | New Find (secs) | Old Find (secs) | Improvement |
|---|---|---|---|
| 1 | 0.49 | 1.73 | 3.4 |
| 2 | 0.45 | 2.11 | 4.6 |
| 4 | 0.51 | 3.79 | 7.3 |
| 8 | 0.65 | 6.82 | 10.3 |
| 16 | 0.64 | 15.08 | 22.9 |
| 32 | 0.75 | 39.25 | 52.3 |

As shown in the examples above, the same find operation was executed on the union view (Old Find) and on the unmounted views (New Find). The New Find operation was significantly faster. FIG. 1 is a diagram illustrating an architecture of a host platform 100 implementing containerized applications in accordance with an example embodiment. For example, the host platform 100 may be a cloud platform, a web server, a database, and the like. In some embodiments, the host platform 100 may be a distributed group of devices that work together to manage applications, data, and the like. The architecture shown in FIG. 1 may be referred to as a cluster. Although not shown in FIG. 1, the cluster may be hosted by a set of nodes of the host platform 100 that run containerized applications where the applications are packaged into containers along with the data necessary for running the applications such as libraries, bins, initial data values, and the like. The cluster may include a control plane 110 and compute machines 120 (also referred to as compute nodes).

A cluster must include at least one compute machine 120. The control plane 110 is responsible for managing the compute machines 120 and ensuring that the cluster is running as configured by the organization. The control plane 110 is in constant communication with the compute machines 120. In this example, the control plane 110 may include an API server 111 that is the front-end of the control plane 110. In this example, the API server 111 may handle internal and external requests from an operator. In particular, the operator may input commands through API calls to the API server 111 to configure the compute machines 120. Here, the API server 111 may determine if the request is valid, and process the valid requests.

The control plane 110 may also include a scheduler 112. The scheduler 112 considers the resources of a pod (a set of containerized applications grouped together) and schedules the pod to an appropriate compute machine 120. The control plane 110 may also include a controller manager 113 that controls how the cluster is run. For example, the controller manager 113 may consult the scheduler 112 and ensure that the correct number of pods are running. If a pod goes down, the controller manager 113 may respond. The controller manager 113 may connect services to pods, so requests go to the correct endpoints. The controller manager 113 may also create accounts and API access tokens. Furthermore, the database 114 may store the configuration data of the cluster.

Meanwhile, each compute machine 120 may host one or more pods 123 within a container runtime 127 of the compute machine 120. The scheduler 112 may schedule and orchestrate the pods 123 to run on the compute machines 120. Each pod 123 may include a container or a series of containers (e.g., tightly coupled) along with options that govern how the containers are run. In the example of FIG. 1, the pod 123 includes containers 124, 125, and 126, which are included therein. The pods 123 and the containers 124, 125, and 126, can be connected to a persistent storage 130 to obtain persistent volumes (PVs) for storage of data and for maintaining state of the applications in the containers 124, 125, and 126.

Each compute machine 120 may also include a control application 121 and a proxy 122. The control application 121 may communicate with the control plane 110 and ensure that the containers are running as they are supposed to be in the pods 123. When the control plane 110 needs an action to occur in a compute machine 120, the control plane 110 sends the request to the control application 121, which carries out the request. The proxy 122 is a networking proxy which facilitates networking communications inside the cluster and outside the cluster. The compute machines 120 may also communicate with a container registry 140 which includes information (e.g., images) of the containers in each pod 123. The container registry 140 may also be used to pull the images down to the pods 123 if needed.

Figure 2:
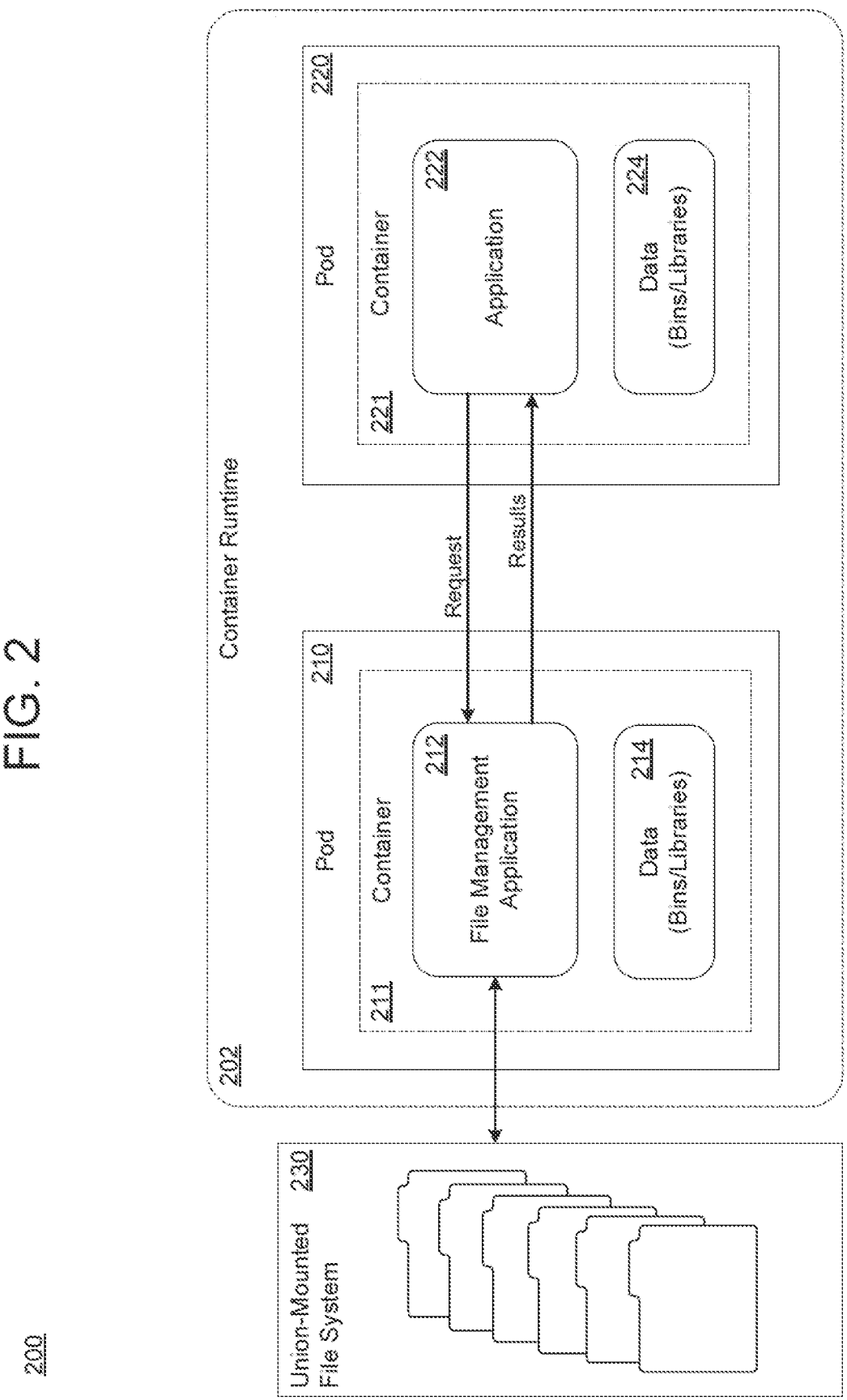
FIG. 2 is a diagram illustrating an architecture of a file system management application in accordance with an example embodiment.

FIG. 2 illustrates an architecture 200 for executing a file management application 212 in accordance with an example embodiment. Referring to FIG. 2, the architecture 200 includes the file management application 212 within a pod 210 of a container runtime 202. Here, the file management application 212 may be containerized within a data container 211 that includes data 214 for running the file management application 212 including libraries, binary files, and the like. The file management application 212 may persist data stored to a union-mounted file system 230. Also, the file management application 212 may be used to read the data, update the data, modify the data, and the like, within the union-mounted file system 230.

In the example of FIG. 2, an application 222, that has also been containerized within a data container 221 may access files that are stored within the union-mounted file system 230 via the file management application 212. Here, the application 222 and the file management application 212 may be stored in different pods 210 and 220, but embodiments are not limited thereto. In some embodiments, the application 222 and the file management application 212 may be included in the same pod. In this example, the container 221 may include data 224 for running the application 222 including libraries, binary files, and the like. The containers 211 and 221 within the pods 210 and 220 may be hosted by a host platform such as the host platform 100 shown in FIG. 1. Here, the containers 211 and 221 may communicate via sockets thereof. In this example, the application 222 may access files stored in the union-mounted file system 230 via the file management application 212. Here, requests for data items such as file names, keywords, etc., may be received and a corresponding find operation may be generated by the file management application 212 and submitted to the union-mounted file system 230.

FIG. 3A illustrates a process 300A of executing a find operation on a union-mounted file system (union mount 360). Referring to FIG. 3A, a plurality of layers 310, 320, 330, 340, and 350 (e.g., a plurality of file systems) including a plurality of subsets of directories 312, 322, 332, 342, and 352 are hosted within a file system. For example, layer 310 includes a subset of directories 312 stored therein, layer 320 includes a subset of directories 322 stored therein, layer 330 includes a subset of directories 332 stored therein, layer 340 includes a subset of directories 342 stored therein, and layer 350 includes a subset of directories 352 stored therein. In this example, some of the layers 310-350 may include overlapping or partially overlapping subsets of directories. In this case, the layers may be merged via a merge process based on a mount order among the layers 310-350 which may remove duplicates based on priority among the layers 310-350 as noted by the mount order.

In the example of FIG. 3A, the plurality of layers 310-350 are fused together via a union mount 360. The union mount 360 provides a consolidated view of all of the subsets of directories from the plurality of layers 310-350 within a single view. It also provides a root directory from which all of the directories among the plurality of layers 310-350 are attached. Here, a find operation submitted by the file management application 212 is performed on the union mount 360 which includes the common view of all of the directories. In response, a single batch of results is returned from the find operation being executed on the union mount 360.

Figure 3B:
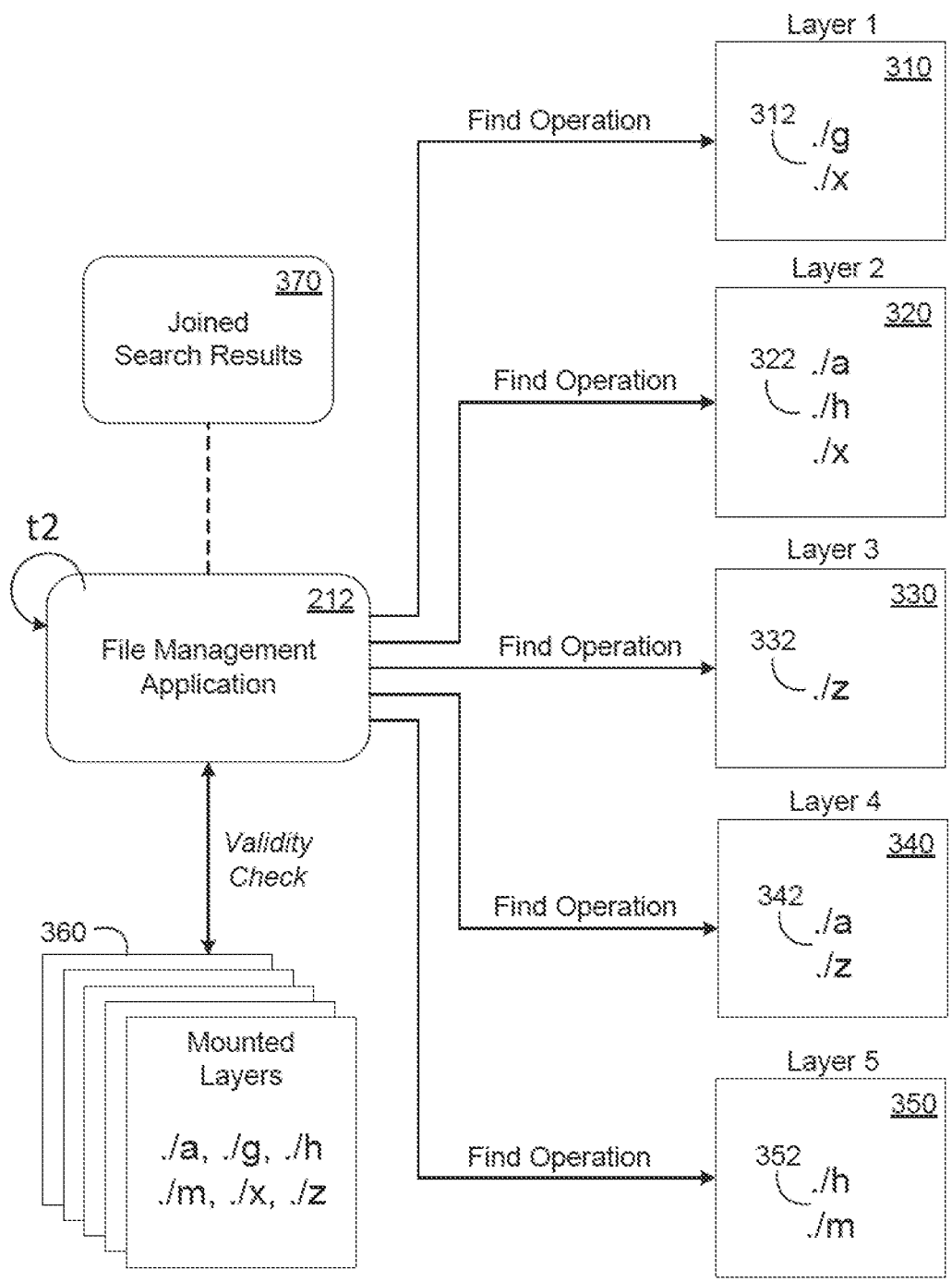
FIG. 3B is a diagram illustrating a process of executing the find operation on the union-mounted file system in accordance with an example embodiment.

The architecture of FIG. 3A is not very efficient. Timeouts can occur because the amount of time it takes to perform the find operation may exceed a time limit specified by the operating system resulting in a timeout. What has been discovered is that performing a find operation on the union mount 360 for folders foo1, foo2, . . . fooN, etc. as layers is much slower than running the same find operation on a single folder that contains copies of these folders. In other words, by removing the union mount 360, and treating it as a single file system, the amount of time necessary to perform the find operation can be significantly reduced. An example of such a process is shown an described with respect to FIG. 3B.

FIG. 3B illustrates a process 300B of executing the find operation on the union-mounted file system in accordance with an example embodiment. Referring to FIG. 3B, rather than execute the find operation on the union mount 360, the file management application 212 may access the individual layers 310, 320, 330, 340, and 350, prior to being added to the union mount 360 and query the layers 310, 320, 330, 340, and 350 individually/separately with different instances of the find operation. Each layer may return a subset of results from the find operation. The file management application 212 may fuse the results together similar to the mounting process that is performed to generate the union mount 360. Thus, the query/find operation can be submitted separately and uniquely to each individual layer 310, 320, 330, 340, and 350. Here, the find operation may be processed in parallel for each of the layers 310, 320, 330, 340, and 350. Therefore, the find operation only takes as long as the slowest layer, and not a combination of all the layers 310-350 through the union mount 360.

As an example, the file management application 212 may retrieve paths of the layers 310-350 from the union-mounted file system where the find operation is going to be performed. For each layer of the plurality of layers 310, 320, 330, 340, and 350, the file management application 212 may run a respective find operation provided by the operating system. The find operation may return the file paths within the file system where a search item (e.g., a file, etc.) is found. For example, a user may query a file system for all files with a keyword "tiger." In this case, the find operation may return paths of all files with the keyword "tiger" therein.

Next, for each layer, the file management application 212 may obtain the relative paths of the files from the paths returned by the find operation. As an example, if the layer path is foo/, and the absolute path is foo/tee/file, then the relative path is tee/file. Furthermore, the file management application 212 may store the relative paths obtained. Next, the file management application 212 may join all relative paths obtained and remove duplicates 370. For each remaining relative path, the file management application 212 may check if that path exists in the union mount 360, and if so, the path is added to the final results. The check performed here the file management application may be performed via a stat operation of the union mount which is very fast and therefore can be performed without adding much overhead and time to the overall process.

By executing the find operation separately and in parallel in each of the plurality of layers 310, 320, 330, 340, and 350 of the union-mounted file system, the file management application 212 can significantly reduce the amount of processing time it takes with respect to performing the same find operation on the union mount 360. For example, the total processing time (t2) in performing the find operation in the process 300B of FIG. 3B, may be significantly smaller than the total processing time (t1) of performing the same find operation on the union mount 360 as shown in the process 300A of FIG. 3A. Part of this can be attributed to performing the find operation in parallel on each of the layers 310, 320, 330, 340, and 350. Another part of this benefit can be attributed to the delay caused by the union mount itself.

Figure 4:
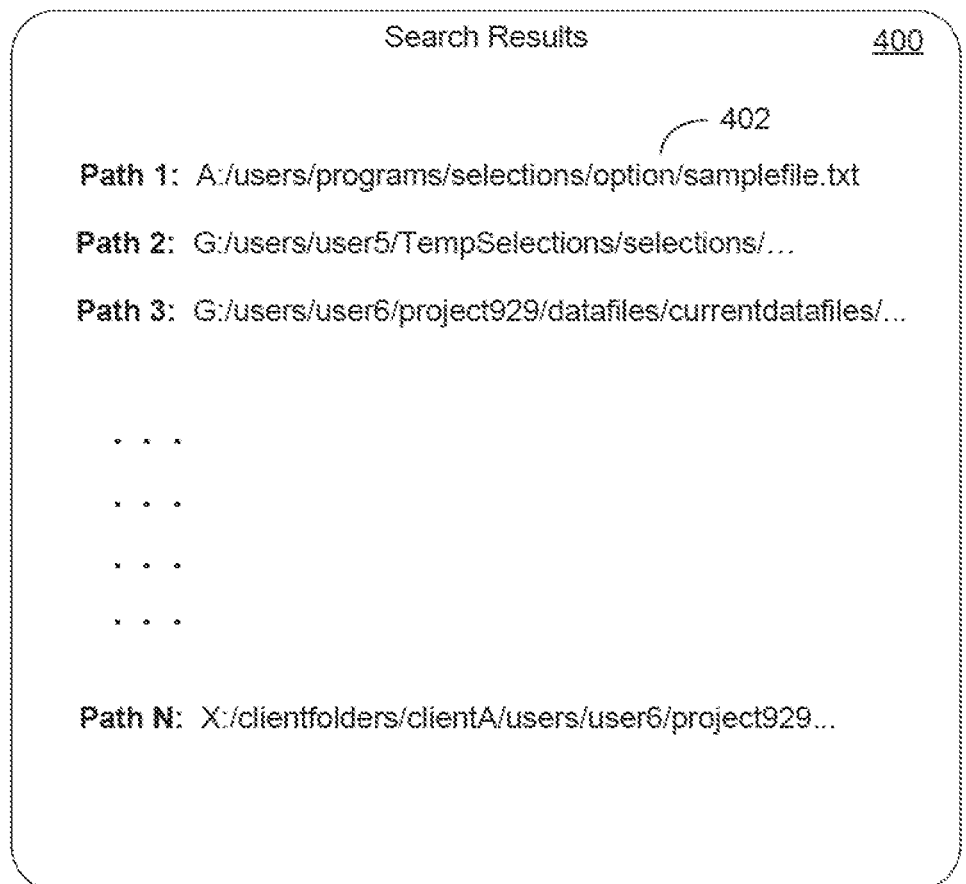
FIG. 4 is a diagram illustrating search results that may be returned from a find operation in accordance with an example embodiment.

FIG. 4 illustrates search results that may be returned from a find operation in accordance with an example embodiment. Referring to FIG. 4, a user interface 400 may include a display of a plurality of search results 402. Each search result may include a file path/location within the file system where a file matching the search criteria can be found. In some embodiments, the search results may also specify the layer from which the file comes from as well.

Figure 5:
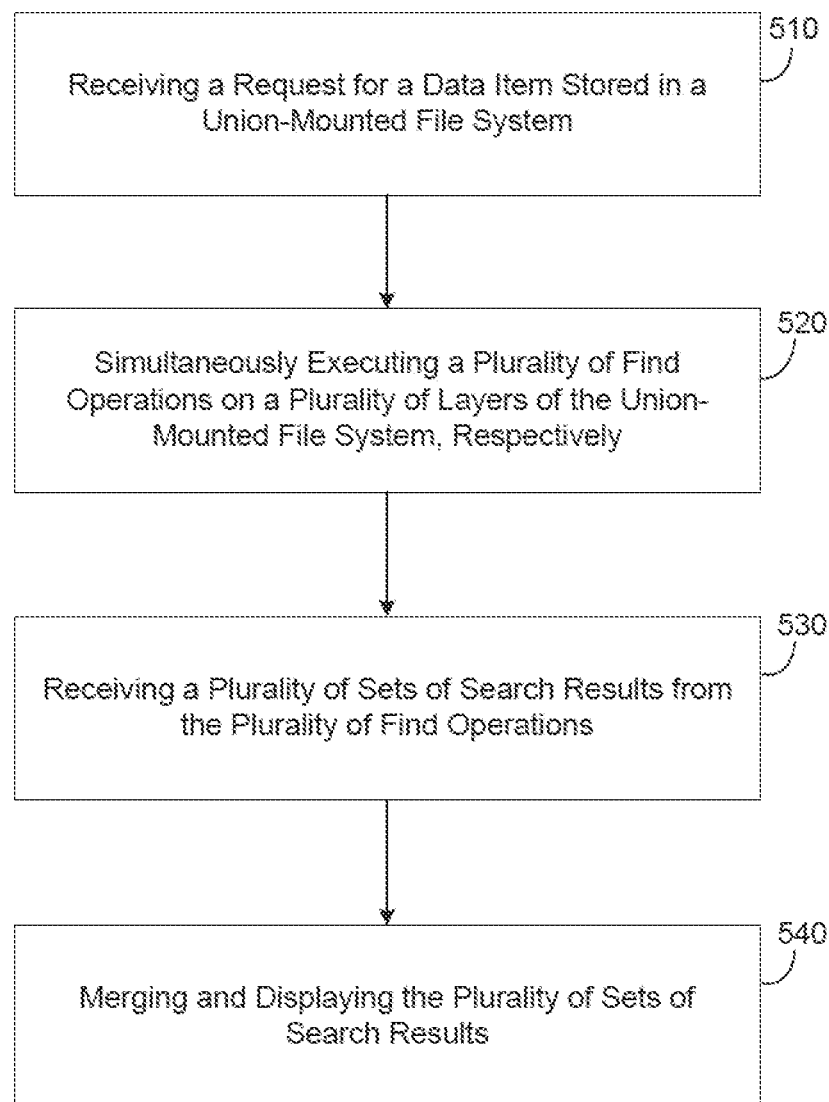
FIG. 5 is a diagram illustrating a method of executing a find operation on a file system in accordance with an example embodiment.

FIG. 5 illustrates a method 500 of executing a find operation on a file system in accordance with an example embodiment. For example, the method 500 may be executed by a database node, a cloud platform, a server, a computing system (user device), a combination of devices/nodes, or the like, which host a file system. Referring to FIG. 5, in 510, the method may include receiving a request for a data item to be retrieved from a union-mounted file system comprising a plurality of layers of files which have been merged together. For example, a query or other request may be submitted via a user interface search option, or the like. As another example, a query may be automated from another application, service, etc.

In 520, the method may include simultaneously executing, via a file manager, a plurality of find operations on the plurality of layers, respectively, without merging the plurality of layers together. In this case, the file manager may simultaneously execute different instances of the find operation within each of the different layers of the union-mounted file system thereby processing the query in parallel on all of the files. In 530, the method may include receiving a plurality of sets of search results of the plurality of separate find operations from the plurality of layers in response to the executing. Further, in 540, the method may include merging and displaying the plurality of sets of search results.

In some embodiments, the plurality of layers may include a plurality of file systems, respectively, which have been mounted together on a common root path in the union-mounted file system. In some embodiments, the simultaneously executing may include simultaneously executing the plurality of find operations on a plurality of partially overlapping subsets of directories stored within the plurality of layers, respectively. In some embodiments, the simultaneously executing may include executing a different respective instance of the find operation with a common search parameter in each layer among the plurality of layers.

In some embodiments, the plurality of sets of search results comprise a plurality of sets of file paths corresponding to the data item. In some embodiments, the merging may include performing a join operation on the plurality of sets of file paths and removing duplicate file paths among the plurality of sets of file paths. In some embodiments, the method may further include checking whether the plurality of sets of file paths exist in the union-mounted file system and removing any paths that do not exist in the union-mounted file system. In some embodiments, the file manager is containerized and stored within a pod including one or more other containerized applications, and the receiving the request comprises receiving the request from a containerized application from among the one or more other containerized applications in the pod.

Figure 6:
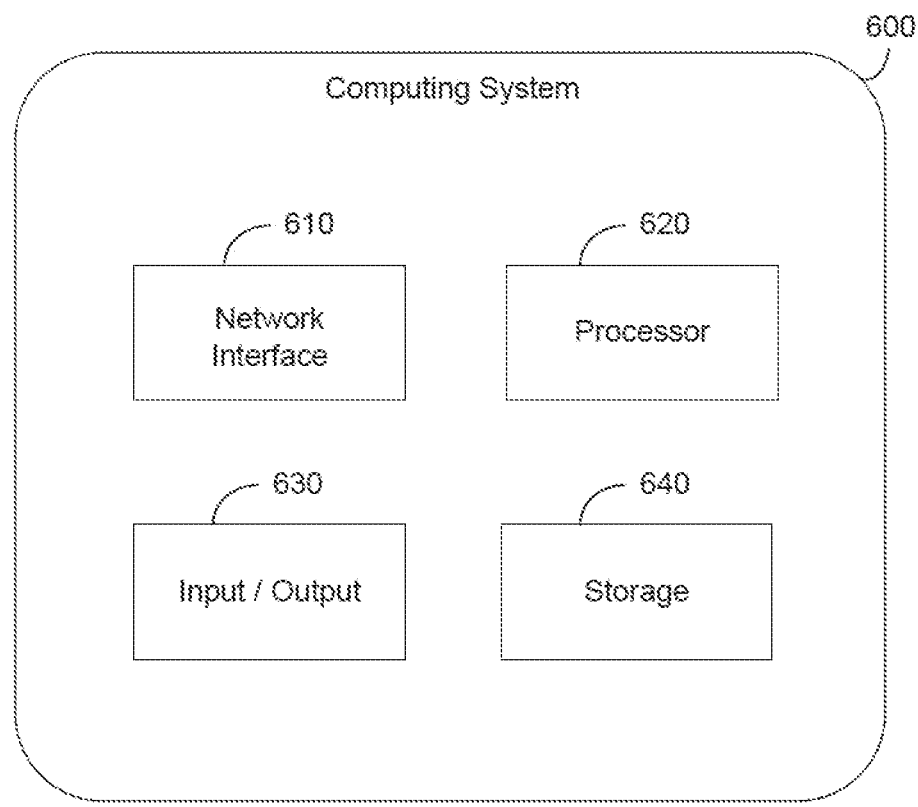
FIG. 6 is a diagram illustrating a computing system for use in the examples herein in accordance with an example embodiment.

FIG. 6 illustrates a computing system 600 that may be used in any of the methods and processes described herein, in accordance with an example embodiment. For example, the computing system 600 may be a database node, a server, a cloud platform, a virtual machine, or the like, which hosts containerized applications. In some embodiments, the computing system 600 may be distributed across multiple computing devices such as multiple database nodes. Referring to FIG. 6, the computing system 600 includes a network interface 610, a processor 620, an input/output 630, and a storage 640 such as an in-memory storage, and the like. Although not shown in FIG. 6, the computing system 600 may also include or be electronically connected to other components such as a display, an input unit(s), a receiver, a transmitter, a persistent disk, and the like. The processor 620 may control the other components of the computing system 600.

The network interface 610 may transmit and receive data over a network such as the Internet, a private network, a public network, an enterprise network, and the like. The network interface 610 may be a wireless interface, a wired interface, or a combination thereof. The processor 620 may include one or more processing devices each including one or more processing cores. In some examples, the processor 620 is a multicore processor or a plurality of multicore processors. Also, the processor 620 may be fixed or it may be reconfigurable. The input/output 630 may include an interface, a port, a cable, a bus, a board, a wire, and the like, for inputting and outputting data to and from the computing system 600. For example, data may be output to an embedded display of the computing system 600, an externally connected display, a display connected to the cloud, another device, and the like. The network interface 610, the input/output 630, the storage 640, or a combination thereof, may interact with applications executing on other devices.

The storage 640 is not limited to a particular storage device and may include any known memory device such as RAM, ROM, hard disk, and the like, and may or may not be included within a database system, a cloud environment, a web server, or the like. The storage 640 may store software modules or other instructions which can be executed by the processor 620 to perform the method shown in FIG. 6. According to various embodiments, the storage 640 may include a data store having a plurality of tables, records, partitions and sub-partitions. The storage 640 may be used to store database records, documents, entries, and the like.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
a union-mounted file system comprising a plurality of file systems which have been merged together on a single mount point; and
a processor configured to
receive a request for a data item from the union-mounted file system,
simultaneously execute, via a file manager of the union-mounted file system, a plurality of find operations on file paths within the plurality of file systems, respectively, to generate a plurality of sets of search results from the plurality of file systems, wherein each search result includes a file path where a search item is found,
check that file paths included in the plurality of sets of search results are included in the single mount point of the union mount file system,
fuse file paths within the plurality of sets of search results from the plurality of file systems to generate a fused set of search results based on the checking, and
display the fused set of search results.

2. The computing system of claim 1, wherein the plurality of file systems are mounted together on a common root directory in the union-mounted file system.

3. The computing system of claim 1, wherein the processor is configured to simultaneously execute the plurality of find operations on a plurality of partially overlapping subsets of directories stored within the plurality of files systems, respectively.

4. The computing system of claim 1, wherein the processor is configured to execute a different respective instance of the find operation with a common search parameter in each file system among the plurality of file systems.

5. The computing system of claim 1, wherein the plurality of sets of search results comprise a plurality of sets of file paths corresponding to the data item.

6. The computing system of claim 5, wherein the processor is configured to execute a join operation on file paths included in the plurality of sets of search results and remove duplicate file paths among the plurality of sets of file paths prior to fusing the file paths together.

7. The computing system of claim 1, wherein the processor is further configured to remove any search results with file paths that do not exist in the union-mounted file system from the plurality of sets of search results prior to the fusing.

8. The computing system of claim 1, wherein the file manager is containerized and stored within a pod including one or more other containerized applications, and the processor is configured to receive the request from a containerized application from among the one or more other containerized applications in the pod.

9. A method comprising:
receiving a request for a data item to be retrieved from a union-mounted file system comprising a plurality of file systems which have been merged together on a single mount point;
simultaneously executing, via a file manager of the union-mounted file system, a plurality of find operations on file paths within the plurality of file systems, respectively, to generate a plurality of sets of search results from the plurality of file systems, wherein each search result includes a file path where a search item is found;
checking that file paths included in the plurality of sets of search results are included in the single mount point of the union mount file system;
fusing file paths within the plurality of sets of search results from the plurality of file systems to generate a fused set of search results based on the checking; and
and displaying the fused set of search results.

10. The method of claim 9, wherein the plurality of file systems are mounted together on a common root directory in the union-mounted file system.

11. The method of claim 9, wherein the simultaneously executing comprises simultaneously executing the plurality of find operations on a plurality of partially overlapping subsets of directories stored within the plurality of file systems, respectively.

12. The method of claim 9, wherein the simultaneously executing comprises executing a different respective instance of the find operation with a common search parameter in each file system among the plurality of file systems.

13. The method of claim 9, wherein the plurality of sets of search results comprise a plurality of sets of file paths corresponding to the data item.

14. The method of claim 12, wherein the merging comprises performing a join operation on file paths included in the plurality of sets of search results and removing duplicate file paths among the plurality of sets of file paths.

15. The method of claim 9, wherein the method further comprises removing any search results with file paths that do not exist in the union-mounted file system from the plurality of sets of search results prior to the fusing.

16. The method of claim 9, wherein the file manager is containerized and stored within a pod including one or more other containerized applications, and the receiving the request comprises receiving the request from a containerized application from among the one or more other containerized applications in the pod.

17. A non-transitory computer-readable storage medium comprising instructions which when executed by a processor cause a computer to perform a method comprising:
receiving a request for a data item to be retrieved from a union-mounted file system comprising a plurality of file systems which have been merged together on a single mount point;
simultaneously executing, via a file manager of the union-mounted file system, a plurality of find operations on file paths within the plurality of file systems, respectively, to generate a plurality of sets of search results from the plurality of file systems, wherein each search result includes a file path where a search item is found;
checking that file paths included in the plurality of sets of search results are included in the single mount point of the union mount file system;
fusing file paths within the plurality of sets of search results from the plurality of file systems to generate a fused set of search results based on the checking; and
displaying the fused set of search results.

18. The non-transitory computer-readable medium of claim 17, wherein the plurality of file systems are mounted together on a common root directory in the union-mounted file system.

19. The non-transitory computer-readable medium of claim 17, wherein the simultaneously executing comprises simultaneously executing the plurality of find operations on a plurality of partially overlapping subsets of directories stored within the plurality of file systems, respectively.

20. The non-transitory computer-readable medium of claim 17, wherein the simultaneously executing comprises executing a different respective instance of the find operation with a common search parameter in each file system among the plurality of file systems.

\* \* \* \* \*